Oct. 24, 1967     I. G. NADEL     3,348,445
METHOD OF MAKING SOLID PROPELLANTS IN TEXTILE FORM
Original Filed Feb. 10, 1965
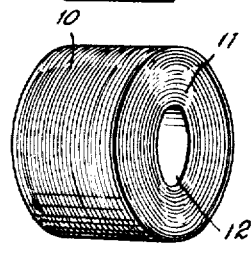
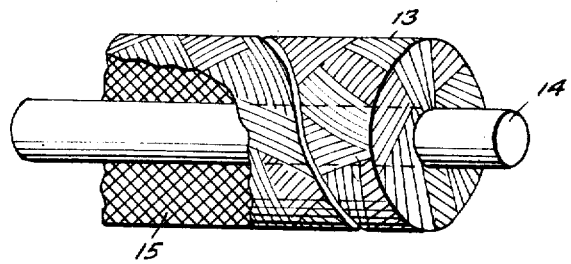
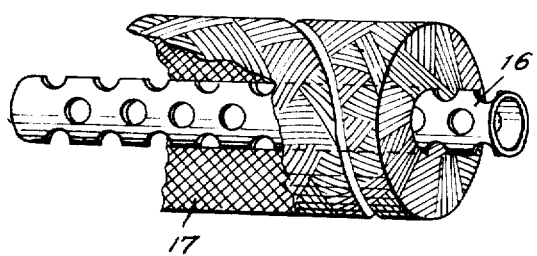
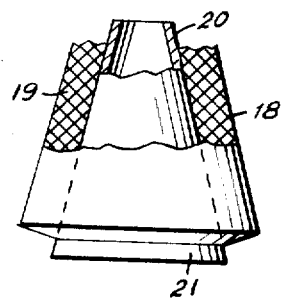
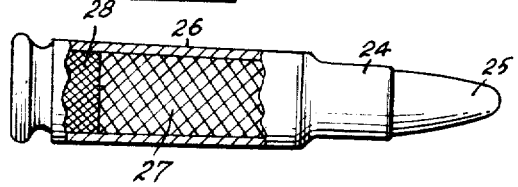
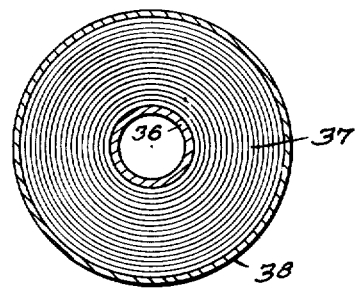
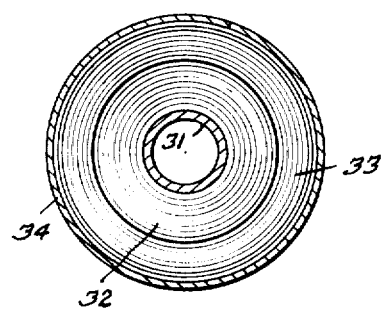
INVENTOR,
Isidore G. Nadel
BY: Harry M. Saragovitz,
Edward J. Kelly &
A. J. Dupont
ATTORNEYS.

United States Patent Office 3,348,445
Patented Oct. 24, 1967

3,348,445
METHOD OF MAKING SOLID PROPELLANTS
IN TEXTILE FORM
Isidore G. Nadel, 628 Highland Ave.,
Little Falls, N.J. 07424
Original application Feb. 10, 1965, Ser. No. 431,745, now Patent No. 3,304,867, dated Feb. 21, 1967. Divided and this application Dec. 7, 1965, Ser. No. 523,479
7 Claims. (Cl. 86—1)

The invention described herein may be manufactured and used by or for the Government for governmental purposes, without the payment to me of any royalty thereon.

This application is a division of application Ser. No. 431,745, filed Feb. 10, 1965, for Solid Propellants in Texile Form, which issued as Patent No. 3,304,867. The parent application was in turn a continuation-in-part of application Ser. No. 180,929, filed Mar. 12, 1962, now abandoned, which was in turn a continuation of application Ser. No. 697,296, filed Nov. 18, 1957, and now abandoned.

This invention relates to a method for making solid propellants, and more particularly, the invention concerns continuous filamentary strands which can be spun from propellant compositions and formed into highly combustible, textile-type packages.

Prior to the discovery of the present method, propellant charges for use in cartridges, artillery ammunition, mortars, rockets and the like, have been produced from a plastic colloidal mass of cellulose nitrate, said mass including various other constituents of the charge dissolved or suspended therein. These charges were commonly prepared in a variety of forms, such as, flakes, sheets, pellets, strips, cards or rods and loaded into conventional cartridge cases and other containers.

According to a prior art practice, propellant charges were also obtained by extrusion of a plastic composition through suitable dies to form a sheet, ribbon, cord or perforated, spaghetti-like strings that were subsequently fed to cutting machines and reduced to segments, sections, wafers or grains of desired dimensions. This method and the propellant structures produced thereby possessed several undesirable characteristics. Uniformity in grain size was difficult to achieve because the extruded material possessed considerable dimension, consequently, solvent removal from the extruded form was undesirably lengthy and difficult to control with any degree of accuracy, resulting in uneven shrinkage in the dried product. Also, the fibers in the extruded form were considerably brittle and of inferior mechanical strength.

Proper ballistic performance is dependent upon the propellant remaining as an integral unit during handling and also during combustion of the charge. Fragmentation in the charge exposes a greater burning surface than that considered desirable with the result that erratic ballistic performance may be obtained. Considerable difficulty was also encountered in providing for uniform distribution and optimum packing of previous forms, such as staple lengths, sheets and woven materials into cartridge cases, projectile chambers, etc. and at the same time retain sufficient mechanical strength in these forms to prevent further fragmentation of the propellant.

The above cited difficulties encountered in formulating propellant charges with determinable and reproducible ballistic performance served to emphasize the importance to be accorded the development of a novel method for producing grains with uniform ballistic properties and subject to precision control by the manufacturer.

Accordingly, an object of the present invention resides in the method of producing a propellant form which may be used without cartridge cases of either the combustible or conventional metal types.

Another object of the invention is to provide a method for producing a solid propellant in textile form which is superior to prior art extruded material in that it offers greater resistance to fracture and fragmentation.

A further object is to provide a novel method which can produce propellant packages with more desirable ballistic properties.

Other objects and advantages of the invention will become obvious to those skilled in the propellant art as the invention is described hereinafter.

According to the present invention, a solid propellant is formed from textile-type filamentary material capable of being twisted, plied or otherwise wound into "yarn" packages of any desired shape and size. The solid propellant comprises continuous filament formed into a unitary bundle by grouping various filaments into strands, yarns, threads, tows and the like, and winding the same into cylindrical, spherical, conical and other forms for use as propellant grains. Thus, in accordance with the present method, a filament of propellant composition is wound to a prescribed pattern and thickness to form a solid, spun propellant with varied ballistic properties.

As disclosed in my aforementioned parent application, numerous propellant compositions of the nitrocellulose type may be formed into a spinning dope by solution in any suitable volatile solvent, such as acetone. The spinning dope is then extruded under pressure through spinnerettes similar to those normally employed in the manufacture of synthetic textile fibers and then solidified into continuous filaments by either the wet or dry spinning methods conventionally used in spinning viscose or cellulose acetate. The resulting filaments are then arranged into multifilament strands, tows or yarns and wound on tubes or cores, and also in the form of hollow, wound bodies of any desired configuration, size and density according to the specific ballistic properties desired.

For the purposes of this invention, terms such as "filamentary material" and "textile-type material" are defined as including any propellant material composed of or containing structural units having dimensions, strength, flexibility and other characteristics sufficiently similar to conventional textile fibers to permit it to be processed on conventional textile machinery to form textile-like strands, yarns, threads, fabrics and filament structures.

The term "strand" as used in the specification designates any textile structure characterized with extreme length as compared to its width or diameter, whether composed of a continuous monofilament or multifilaments and includes yarns, threads, tows or loose bundles of fiber lengths.

The solid propellant of this invention, including a preferred method of producing the same, will now be described in detail with reference to the accompanying drawing in which:

FIGURE 1 illustrates a propellant yarn package formed with a center air space, the package being a continuous winding of nitrocellulose composition;

FIGURE 2 illustrates a similar propellant yarn package wound in an open-wind pattern on a solid, cylindrical core;

FIGURE 3 illustratese a similar package having a close-wind pattern and contained on a perforated core;

FIGURE 4 is a view partly in cross section of a conically wound, hollow propellant package;

FIGURE 5 illustrates one method of utilizing the textile-type yarn package of the invention;

FIGURE 6 illustrates one embodiment of an "inhibited type" solid propellant yarn package; and FIGURE 7 illustrates another embodiment of an "inhibited type" package.

In the practice of the invention, any substantially non-crystalline, propellant composition may be employed which is capable of forming a flexible, tenuous filament by extrusion through a spinnerette. In general, it has been found that compositions containing large proportions of nitrocellulose are more adaptable for extrusion and form suitable filamentary material for the desired end use. In addition to nitrocellulose, the composition may contain stablilizers, plasticizers, coolants and other modifying agents customarily used in blending modern propellants. The composition is dissolved in any compatible, volatile solvent, such as acetone, and extruded under pressure through a spinnerette having a multiplicity of orifices of a size suitable to produce filaments of the desired denier. The filaments may be spun by either the wet or dry method. In the wet method, the composition forced through the spinnerette passes directly into and through an aqueous bath to solidify the filamentary material and remove the solvent present in the composition. The aqueous bath may be simply water or a dilute solution of such salts as are customarily employed in coagulating synthetic filaments in the manner of viscose rayon and the like. In the dry spinning method, the filaments leaving the spinnerette pass through a stream of warm, humid air for a distance sufficient to solidify the spinning composition and vaporize the bulk of the acetone or other solvent.

During the period of solidification and formation, tension is exerted on the filaments sufficient to stretch them to effect molecular orientation and thus increase the tensile strength of the filaments. At this point, the bundle of filaments issuing from the spinnerete is usually given a slight twist sufficient to hold it together in the form of a unitary tow, bundle or strand. For this purpose, ½ to 3 turns per inch are usually sufficient. The strand formed in this manner may then be wound on a spool, bobbin or core by means of conventional textile winding machines. The wound product may be conveniently stored for further processing or utilized directly as a spun package of propellant charge. Filaments prepared according to the above method may be formed in any desired denier. However, for practical purposes it has been found that filaments having deniers in the range of about 3.75 to 8.0 are to be preferred. Any desired number of filaments may be extruded simultaneously depending on the number of orifices in the spinnerette. The number of orifices may run as high as 200 or more. In the development of the present invention spinnerettes with 40 or 50 orifices were employed. Thus, the bundle of filaments produced by these spinnerettes ranged in size from 150/40 (40 filaments having an individual denier of 3.75 giving a total strand denier of 150) to 400/50 (50 filaments having an individual denier of 8.0 giving a total strand denier of 400).

The bundle of filaments, yarn or tow described above may be further processed to impart a higher degree of twist, depending upon the desired properties in the final product. The resulting yarn is then wound in a predetermined pattern on any suitable type core element, as will be described in greater detail with reference to various embodiments of wound packages of any desired size, configuration and density. The filaments of the yarn package may be bonded together by suitable bonding compositions, and the packages may be at least partially encased with a layer of a combustible, non-propellant material formed of a plurality of windings.

FIGURE 1 of the drawing shows a yarn package 10 comprising a multiplicity of windings 11 of a solid propellant wound into a cylindrical configuration and having a hollow core 12. The yarn package may be formed of any desired winding pattern, such as circular or helical windings with any desired spacing between the strands. The pattern may vary from one in which the starting points of consecutive windings are separated by a strand diameter to one which is so complex as to appear completely random. The precision with which the winding pattern is maintained will dictate the quality and properties of the propellant yarn package.

Propellants are utilized under conditions by which they are ignited and burned. The form of the propellant as well as its characteristic burning rate determines the time required for complete burning, recognized in the art as relative "quickness" values of the propellants. When the propellant yarn, in accordance with the present invention, is wound closely and tightly to form a dense package, the burning time is different from that of a more loosely wound package. Therefore, by controlling the density and physical form of the propellant charge, the ballistic effect of the propellant is determined and kept near optimum values.

As a further explanation of the manner in which strands in a wound package can be utilized effectively as a propellant charge, there is shown in FIGURE 2, a yarn package 13 having a cylindrical configuration as in the previous embodiment of FIGURE 1, but in the present embodiment the yarn is wound on a solid core 14. The core may be made of a material such as metal, plastic, or wood. Helical windings 15 are depicted as wound on the core in a relatively open structure with a considerable amount of air spacing between the strands. The helical winding pattern of high angles shown in the drawing is merely intended to illustrate a further variation which may be achieved in the solid, spun propellant of the present invention. The density or porosity of the spun propellant package may be varied at will (1) by selecting the proper pattern for winding the yarn on the core (2) by varying the denier and degree of twist in the strand and (3) by adjusting the spacing between adjacent windings in said package. Closely wound strands will result in a tight, dense package whereas strands wound with a certain uniform spacing between adjacent windings will result in a loose, porous package.

FIGURE 3 illustrates a package similar to that of the previous embodiment, however, the strands are now wound on a perforated core 16 of any selected material. The perforated design provides further means for varying the burning characteristics of the charge. Also, the strand is depicted herein as closely wound and providing a more dense package resulting thereby in a burning time which is different from that obtained from the structure with open windings, as shown in FIGURE 2.

A further embodiment of the present propellant is illustrated in FIGURE 4 which shows a conical yarn package 18 wound on a cardboard cone 20. The propellant strand 19 may be wound on the cone with progressively varying spacings to provide varying densities in the package. The cone on which the propellant yarn is wound may be removed, if desired, or the package may be wound on a removable conical mandrel by conventional textile machinery.

A spun propellant grain or yarn package with desirable ballistic properties may be fabricated by varying (1) the length of propellant strand wound into a package (2) the length of the propellant package (3) the inner and outer diameters of the package and (4) the type of propellant strand wound in said package. The propellant strand forming the packge may comprise a loose, relatively untwisted bundle or tow of continuous monofilament or it may comprise a tightly wound, twisted bundle of filaments. Additionally, plied yarn may be employed, each ply being formed of the same type of filaments or of filaments with different denier, twist, ply or chemical composition. The yarn may also be blended of a plurality of propellant filaments spun from different propellant compositions, or diluted with varying amounts of a non-propellant yarn, such as cellulose acetate, regenerated cellulose and the like.

The following specific examples are given by way of illustration of solid propellant compositions which may form the yarn packages of the present invention. In these examples, as elsewhere throughout the specification, all parts and percentages are given in terms of weight.

Example I

A quantity of continuous filament yarn was spun using the following propellant composition:

| | Percent |
|---|---|
| Nitrocellulose (12.6% N) | 99 |
| Diphenylamine | 1 |

One part of the above composition was dissolved in four parts by weight of acetone. The solution was filtered through cotton flannel to free it of all undissolved gels and other insoluble impurities. The resulting spinning dye or lacquer was extruded under pressure through a spinnerette having 40 orifices of a size sufficient to result in individual filaments having a denier of 3.75. On leaving the spinnerette, the bundle of 40 filaments were passed through a warm, humid atmosphere for a distance sufficient to result in substantially complete removal of the acetone solvent from the filaments. During the drying stage the filaments were stretched slightly to effect molecular orientation and thus increase the tensile strength of the individual filaments. An S-twist of approximately one-half turn per inch was imparted to the bundle of filaments, and the bundle was then wound on a storage reel. Subsequently, the yarn was given a further S-twist of about 10 turns per inch and then rewound on a cylindrical cardboard core 6½ inches long and ¾ inch in diameter in the form of a tightly wound yarn of 2 inches in thickness and 6 inches in length. The resulting yarn package was used as a single grain of propellant in place of the customary cartridge case containing a large number of the usual small perforated grains.

It is desirable at this point to emphasize several features of the above propellant package whereby variations and advantages of the ballistic properties are now possible. The novel form of wound strands of propellant affords means of attaining precision control over the burning rate and other properties of the grain. The difficulty previously encountered in fabricating multiperforated grains with exceptionally thin webs are readily overcome by the present multifilament strands. The size of the orifices may be varied to extrude finer or heavier denier filaments, the preferred range of filaments being from 3.75 to 8.0 denier per filament, but actually being limited only by mechanical difficulties in handling extremely fine or coarse filaments. The number of filaments may also be varied, thus providing larger or smaller strands. Bundles of filaments may also be combined before twisting to form tows having several hundred monofilaments therein.

Furthermore, the amount of twist imparted to the strand may be varied according to the precise ballistic properties desired. Two identical, twisted strands may be plied together, or a plied yarn may be formed wherein one of the plies is formed in one manner according to the invention, while another ply may have the same chemical composition but different denier filaments, varying number of filaments, twists, etc. Also, each ply may consist of filaments of a different propellant composition. Where dilution is desired, a propellant yarn may be plied with a non-propellant yarn, composed of cellulose or any synthetic fiber.

Variations may also be achieved in the density of the yarn by winding the strand with an indexed interval between adjacent windings and by employing various types of winding patterns to form open or close wound packages. Grain density may also be increased by lightly wetting the strand with a nitrocellulose solvent, such as acetone, just prior to winding. In this manner, the surface of the strand is softened or gelatinized slightly, and on being wound, is cemented firmly to adjacent windings of the yarn. Various bonding agents, such as the epoxy resins, and various plasticizers, such as, triacetin or dibutylphthalate, may also be applied to the yarn during processing.

The results of various tests which measure sensitivity, accelerated stability and firing have shown that propellant yarns and propellant packages of the present invention are stable, not unduly sensitive and therefore may be handled with normal precautions as in conventional propellants.

Example II

A propellant powder having the following composition:

| | Percent |
|---|---|
| Nitrocellulose (13.5% N) | 79.90 |
| Nitroglycerin | 19.50 |
| Ethyl centralite | 0.60 | was dissolved in acetone to obtain a spinning dope containing 78% acetone and 22% nonvolatile components. After filtering through cotton flannel, the dope was extruded under pressure through a spinnerette having 50 orifices of a size sufficient to provide filaments having a denier of 8.0. After processing by the dry method of spinning, as described in Example I, the bundle of filaments was given a Z-twist of approximately 15 turns per inch and plied with a strand produced according to Example I having an S-twist of 10 turns per inch. The final two-ply yarn was then wound on a solid cylindrical core in a helical winding pattern, shown schematically in FIGURE 2.

Example III

| | Percent |
|---|---|
| Nitrocellulose (12.6% N) | 85 |
| Dinitrotoluene | 10 |
| Dibutylphthalate | 5 |
| Diphenylamine (added to the above mixture) | 1 |

The above propellant composition was dissolved in acetone to form a spinning dope having a concentration of 26.5%±0.2% nonvolatile material. The viscosity of the dope was 2250 poises at 25° C. Suspended particles in the filtered material did not exceed 5 microns in size. A bundle of 40 filaments having a filament denier of 3.75 and a total denier of 150 was spun by the dry method described in Example I. Microscopic examination of the filaments showed substantially round cross-sections. No evidence of crystalline or solid foreign matter was apparent in the filaments. The filaments were water-rinsed to reduce residual solvent. The water content of the filaments was then reduced to approximately 25%, and the yarn was wound on a removable mandrel in relatively close spaced, circular winding, as shown in FIGURE 1.

Any known nitrocellulose propellant whether of the single or double base type may be formed into filaments by the present method, except for compositions with a high crystalline content. For all practical purposes, propellant compositions having a crystalline content greater than about 20% have been found to form filaments too fragile to be of use in the manner intended.

Other examples of suitable propellant compositions are as follows:

Example IV

| | Percent |
|---|---|
| Nitrocellulose (13.15% N) | 98 |
| Diphenylamine | 2 |

Example V

| | Percent |
|---|---|
| Nitrocellulose (13.15% N) | 98 |
| Potassium sulfate | 2 |
| Diphenylamine (added to the above mixture) | 1 |

As may be seen from the above compositions, filaments may be spun from any nitrocellulose type propellant, either of the single or double base type. Thus, the explosive ingredient may consist essentially of nitrocellulose, or a varying amount of nitrocellulose may be replaced by nitroglycerin, dinitrotoluene, or the like. In addition to the explosive ingredient or ingredients, the propellant composition should contain a stabilizer, such as diphenylamine, methyl centralite, ethyl centralite, or 2-nitro-diphenylamine. Use of a plasticizer, such as dibutylphthalate or triacetin is found advantageous in many instances. Compounds possessing both explosive and plasticizing properties, such as, nitroglycerin, TEGN (triethylene glycol dinitrate) and DEGN (diethylene glycol dinitrate) may also be used to advantage.

Nitrocellulose of any degree of nitration may be employed. However, nitrocellulose having a nitrogen content of from about 12.6 to 13.25% by weight has been found to be most satisfactory.

FIGURE 5 illustrates one of numerous ways in which the solid propellant of this invention may be utilized in conventional ammunition. Thus, a cartridge designated generally as 24 comprises a bullet 25 attached to a cartridge shell 26 containing a single grain 27 of propellant in the form of a yarn package of appropriate size. The priming material 28 located at the end of the cartridge case may also be utilized in the form of a filament or strand winding within the shell.

If desired, further modification and variation of the burning rate and other ballistic properties of the propellant grain may be made by forming concentric layers of different propellant strands about the core. Thus, for example, a yarn having the composition of Example I may be wound a number of times about the core to give a propellant layer of any desired thickness. This propellant layer may then be followed by a plurality of windings of a yarn of a different composition to form a second concentric layer. A package is formed in this manner in which concentric layers of propellant yarns of different chemical or physical properties are built up to form a grain with the desired ballistic characteristics.

The grains or yarn packages may be inhibited in accordance with the present method to provide additional structures. For example, in the embodiment shown in FIGURE 6, the grain comprises a core 31, the propellant 32 is formed of a multiplicity of windings of the present propellant yarn; a layer of cellulose acetate windings 33 of any desired thickness, but preferably of the order of 1/16 to 1/4 inch, surrounds the propellant windings. A substantially continuous surface coating 34 is formed by applying cellulose acetate butyrate lacquer to the surface of layer 33. A suitable lacquer for surface application consists essentially of a 5% solution of 1/2 second, cellulose acetate-butyrate in equal volumes of methanol and toluene solvents. A layer of this lacquer applied to the surface of layer 33 by brushing, satisfactorily inhibits the propellant and imparts water repellency to the grain.

Another embodiment which illustrates further means for inhibiting a propellant yarn is demonstrated in FIGURE 7 wherein a solid propellant consists of a core 36 and propellant winding 37 and a sheet of cellulose acetate 38 wrapped around said winding and bonded thereto with acetone or other suitable bonding agent.

A further method for inhibiting the present yarn package comprises applying acetone to the external surface of the wound package to soften the external surface sufficiently to form a substantially continuous film of propellant composition around the yarn package.

Although the propellant composition is normally extruded in the form of filaments having a round cross-section, the extruded process may also be adapted to the formation of filaments having elliptical, cruciform, square or other cross-sectional forms.

From the above detailed disclosure and examples of my invention, it will be apparent to those skilled in the art that my method of producing a solid propellant charge is ideally suited to provide novel propellants for artillery, small arms, mortar and recoilless ammunition. The comparative ease in producing continuous filament and yarn package on standard textile equipment enables the textile industry to provide immense aid in time of emergency with rapid conversion and know-how in fabricating solid propellant yarn.

In the foregoing description I have disclosed preferred embodiments of my invention. However, it is not intended that this invention be limited to the specific examples set forth above, as it will be apparent to those skilled in the art that the present method is susceptible of numerous changes and modifications without departing from the spirit and scope thereof as set forth in the claims.

Having thus described the invention, what is claimed is:

1. A method of forming a solid, spun propellant comprising:
   twisting a plurality of continuous nitrocellulose filaments to form a strand thereof,
   winding said strand on a central core in a predetermined winding pattern and spacing between adjacent windings of said strand to form a propellant having controllable ballistic properties therein.

2. The method of forming a solid, spun propellant according to claim 1 which includes the step of applying a bonding agent to said strand during said winding operation.

3. The method of forming a solid, spun propellant according to claim 2 in which said core comprises a removable mandrel.

4. The method of forming a solid, spun propellant according to claim 1 in which said strand includes filaments of a non-propellant cellulose composition.

5. The method of forming a solid, spun propellant according to claim 1 which includes the step of winding filaments of a non-propellant cellulose composition over said propellant yarn package.

6. The method of forming a solid, spun propellant according to claim 1 which includes the step of applying a layer of non-propellant, cellulose composition on said propellant yarn package.

7. The method according to claim 6 in which said composition consists essentially of a 5% solution of 1/2 second, cellulose acetate-butyrate dissolved in a solvent of 1:1 methanol and toluene by volume.

References Cited
UNITED STATES PATENTS

| | | | |
|---|---|---|---|
| 1,028,748 | 6/1912 | Lederer | 102—98 X |
| 1,896,642 | 2/1933 | O'Neil | 102—98 X |
| 2,997,955 | 8/1961 | Wade et al. | 102—49 |
| 3,067,686 | 12/1962 | Coover et al. | 86—1 X |

BENJAMIN A. BORCHELT, *Primary Examiner.*

SAMUEL FEINBERG, *Examiner.*

P. A. SHANLEY, *Assistant Examiner.*